US012678923B2

(12) United States Patent
Garces et al.

(10) Patent No.: US 12,678,923 B2
(45) **Date of Patent: *Jul. 14, 2026**

(54) PUSHER MECHANISM FOR POWERED FASTENER DRIVER

(71) Applicant: MILWAUKEE ELECTRIC TOOL CORPORATION, Brookfield, WI (US)

(72) Inventors: Casey D. Garces, Milwaukee, WI (US); Andrew P. Rux, Greendale, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/731,796

(22) Filed: Jun. 3, 2024

(65) Prior Publication Data

US 2024/0316737 A1 Sep. 26, 2024

Related U.S. Application Data

(60) Continuation of application No. 17/544,642, filed on Dec. 7, 2021, now Pat. No. 12,011,811, which is a (Continued)

(51) Int. Cl.

*B25C 1/04* (2006.01)
*B25C 1/00* (2006.01)

(52) U.S. Cl.

CPC .............. *B25C 1/047* (2013.01); *B25C 1/003* (2013.01)

(58) Field of Classification Search

CPC ............ B25C 1/047; B25C 1/003; B25C 1/06

(Continued)

(56) References Cited

U.S. PATENT DOCUMENTS

| | | | |
|---|---|---|---|
| 966,462 | A | 8/1910 | Michel et al. |
| 1,397,176 | A | 11/1921 | Muth |

(Continued)

FOREIGN PATENT DOCUMENTS

| | | | | |
|---|---|---|---|---|
| DE | 10125846 A1 | 12/2001 | | |
| EP | 1702722 A1 * | 9/2006 | ............. | B25C 1/003 |

(Continued)

OTHER PUBLICATIONS

Stanley, "Bostitch CRN38K Cordless Roofing Nailer," <http://www.bostitch.com:80/default.asp?CATEGORY=BOS_ROOFING_NAILER_STAPLER&TYPE=PRODUCT&PARTNUMBER=CRN38K&SDesc=Industrial+Cordless+Roofing+Nailer> Webpage available as early as Aug. 19, 2003, 1 page.

(Continued)

*Primary Examiner* — Robert F Long
(74) *Attorney, Agent, or Firm* — Michael Best & Friedrich LLP

(57) ABSTRACT

A powered fastener driver includes a housing, a nosepiece coupled to the housing and extending therefrom, a cylinder positioned within the housing, a storage chamber cylinder at least partially surrounding the cylinder and containing therein pressurized gas in fluid communication with the cylinder, a moveable piston positioned within the cylinder, a driver blade attached to the piston and movable within the nosepiece between a ready position and a driven position, a canister magazine coupled to the nosepiece in which collated fasteners are receivable, a lifting mechanism operable to move the driver blade from the driven position toward the ready position, an electric motor, and a pusher mechanism. The pusher mechanism includes a body coupled to the nosepiece for relative translation, and a feeder arm coupled to the body for movement therewith and engageable with a (Continued)

forwardmost fastener of the collated fasteners to transfer the forwardmost fastener into the driver channel.

20 Claims, 11 Drawing Sheets

Related U.S. Application Data division of application No. 16/376,632, filed on Apr. 5, 2019, now Pat. No. 11,224,960.

(60) Provisional application No. 62/779,809, filed on Dec. 14, 2018, provisional application No. 62/657,357, filed on Apr. 13, 2018.

(58) Field of Classification Search
USPC .................................................. 227/119–156
See application file for complete search history.

(56) References Cited

U.S. PATENT DOCUMENTS 1,554,686 A 9/1925 Muth
3,267,616 A 8/1966 Stade et al.
3,330,462 A 7/1967 Colechia et al.
3,552,627 A 1/1971 Moreno
3,554,233 A 1/1971 Korth
3,688,966 A 9/1972 Perkins et al.
3,961,408 A 6/1976 Goodsmith et al.
4,146,071 A 3/1979 Mueller et al.
4,389,012 A 6/1983 Grikis et al.
4,389,102 A 6/1983 Grikis et al.
4,442,965 A 4/1984 Leistner
4,463,888 A 8/1984 Geist et al.
4,566,619 A * 1/1986 Kleinholz ............... B25C 1/044 227/118
4,581,964 A * 4/1986 Takatsuru ............. B25B 21/023 81/464
4,600,135 A 7/1986 Mukoyama
4,942,996 A 7/1990 Wolfberg et al.
5,038,993 A 8/1991 Schafer et al.
5,322,189 A 6/1994 Oda
5,452,630 A 9/1995 Haas et al.
5,542,323 A 8/1996 Habermehl et al.
5,570,618 A 11/1996 Habermehl et al.
5,683,024 A 11/1997 Eminger et al.
5,720,423 A 2/1998 Kondo et al.
5,855,151 A 1/1999 Habermehl
5,934,162 A 8/1999 Habermehl
5,943,926 A 8/1999 Habermehl
5,975,900 A 11/1999 Garman
6,109,474 A 8/2000 Haugen
6,672,498 B2 1/2004 White et al.
6,708,860 B1 * 3/2004 Thieleke ................. B25C 1/188 227/119
6,966,476 B2 11/2005 Jalbert et al.
7,137,186 B2 11/2006 Wojcicki et al.
7,225,962 B2 6/2007 Porth et al.
7,455,207 B2 11/2008 Wojcicki et al.
7,699,201 B2 4/2010 Hagan et al.
7,866,521 B2 1/2011 Gross et al.
7,950,556 B2 5/2011 Hagan
8,011,441 B2 9/2011 Leimbach et al.
8,051,919 B2 11/2011 Hagan et al.
8,276,798 B2 10/2012 Moeller et al.
8,302,832 B2 11/2012 Porth et al.
8,636,185 B2 1/2014 Largo et al.
8,931,677 B2 1/2015 Porth et al.
10,549,412 B2 2/2020 McCardle et al.
11,413,735 B2 8/2022 Akiba et al.
2001/0035078 A1 11/2001 Muro
2003/0230621 A1 12/2003 Yamamoto et al.
2005/0072276 A1 4/2005 Lin
2006/0118596 A1 6/2006 Wojcicki et al.
2006/0186171 A1 8/2006 Porth et al.
2006/0283909 A1 12/2006 Shima et al.
2007/0267458 A1 11/2007 Chen
2008/0179371 A1 * 7/2008 Gardner .................... B25C 5/15 227/1
2008/0179372 A1 7/2008 Kurth et al.
2008/0251559 A1 10/2008 Uejima et al.
2008/0290129 A1 11/2008 Schell et al.
2009/0090759 A1 * 4/2009 Leimbach ............... B25C 1/047 227/10
2009/0114697 A1 5/2009 Gross et al.
2009/0255973 A1 10/2009 Tamura et al.
2010/0176175 A1 7/2010 Tamura et al.
2011/0049215 A1 3/2011 McAfee et al.
2011/0315738 A1 12/2011 Liu et al.
2012/0118932 A1 5/2012 Largo et al.
2012/0318550 A1 12/2012 Tanimoto et al.
2015/0352702 A1 * 12/2015 Chien ..................... B25C 1/047 227/130
2016/0023342 A1 1/2016 Koenig et al.
2016/0229043 A1 * 8/2016 Wyler ..................... B25C 1/047
2016/0288305 A1 * 10/2016 McCardle ................. B25C 1/06
2016/0333964 A1 11/2016 Scekic et al.
2017/0239800 A1 8/2017 Moore et al.
2017/0361444 A1 12/2017 Namouz
2018/0126528 A1 5/2018 Pomeroy et al.
2019/0314967 A1 10/2019 Garces et al.
2019/0375084 A1 * 12/2019 Bierdeman ............. B25C 1/047
2020/0189080 A1 6/2020 Aizawa et al.
2020/0206860 A1 * 7/2020 Isobe ..................... B23Q 17/24
2020/0290190 A1 9/2020 Pomeroy et al.
2020/0306941 A1 10/2020 Akiba et al.
2021/0347022 A1 11/2021 Leathrum et al.
2021/0347023 A1 * 11/2021 Carrier ...................... B25C 1/06

FOREIGN PATENT DOCUMENTS

EP 1737621 B1 12/2008
FR 2554751 A1 * 5/1985 ........... B25C 5/1679
JP S5356182 U 5/1978
JP S54133681 A 10/1979
JP S54133682 A 10/1979
JP S54136477 A 10/1979
JP S54136478 A 10/1979
JP S62292184 A * 12/1987

OTHER PUBLICATIONS

Stanely, "The Stanley Works 2000 Annual Report," <http://media.corporate-ir.net/media_files/NYS/SWK/reports/Stanley_AR2000.pdf> 2001, 31 pages.
Eakes, "How do they test power nailers in the factory?" <https://www.joneakes.com/jons-fixit-database/1130-How-do-they-test-power-nailers-in-the-factory.pdf> published Jan. 14, 2001, 1 page.
Stanley, "Bostitch Contruction Tools and Fasteners Catalog," <http://manualzz.com/doc/1349102/construction-staplers> 2001, 60 pages.
Stanley, "Bostitch CRN38K Cordless Roofing Nailer Manual," <http://ec1.images-amazon.com/media/i3d/01/A/man-migrate/MANUAL000004903.pdf> 2000, 10 pages.
Milwaukee Electric Tool, "Coil Roofing Nailer Service Parts List," 2015, 4 pages.
International Search Report and Written Opinion for Application No. PCT/US2019/026043 dated Jul. 23, 2019 (11 pages).
International Search Report and Written Opinion for Application No. PCT/US2021/031018 dated Sep. 3, 2021 (15 pages).
Extended European Search Report for Application No. 19785818.6 dated Jan. 28, 2022 (9 pages).

* cited by examiner

PUSHER MECHANISM FOR POWERED FASTENER DRIVER

CROSS-REFERENCE TO RELATED APPLICATIONS

This application is a continuation of U.S. patent application Ser. No. 17/544,642 filed on Dec. 7, 2021, now U.S. Pat. No. 12,011,811, which is a divisional of U.S. patent application Ser. No. 16/376,632 filed on Apr. 5, 2019, now U.S. Pat. No. 11,224,960, which claims priority to U.S. Provisional Patent Application No. 62/779,809 filed on Dec. 14, 2018 and U.S. Provisional Patent Application No. 62/657,357 filed on Apr. 13, 2018, the entire contents of all of which are incorporated herein by reference.

FIELD OF THE INVENTION

The present invention relates to powered fastener drivers, and more specifically to pusher mechanisms for powered fastener drivers.

BACKGROUND OF THE INVENTION

Powered fastener drivers are used for driving fasteners (e.g., nails, tacks, staples, etc.) into a workpiece. Such fastener drivers typically include a magazine in which the fasteners are stored and a pusher mechanism for individually transferring fasteners from the magazine to a fastener driving channel, where the fastener is impacted by a driver blade during a fastener driving operation.

SUMMARY OF THE INVENTION

The present invention provides, in one aspect, a powered fastener driver including a housing, a nosepiece coupled to the housing and extending therefrom, a cylinder positioned within the housing, a storage chamber cylinder at least partially surrounding the cylinder and containing therein pressurized gas in fluid communication with the cylinder, a moveable piston positioned within the cylinder, a driver blade attached to the piston and movable within the nosepiece between a ready position and a driven position, a canister magazine coupled to the nosepiece in which collated fasteners are receivable, a lifting mechanism operable to move the driver blade from the driven position toward the ready position, an electric motor operable to supply torque to the lifting mechanism to move the driver blade from the driven position toward the ready position, and a pusher mechanism coupled to the nosepiece for individually transferring collated fasteners in the canister magazine to a driver channel in the nosepiece in which the driver blade is movable. The pusher mechanism includes a body coupled to the nosepiece for relative translation therewith, and a feeder arm coupled to the body for movement therewith and engageable with a forwardmost fastener of the collated fasteners to transfer the forwardmost fastener into the driver channel.

The present invention provides, in another aspect, a powered fastener driver including a housing, a motor positioned within the housing, a nosepiece coupled to the housing and extending therefrom, a driver blade movable within the nosepiece between a ready position and a driven position, a canister magazine coupled to the nosepiece in which collated fasteners are receivable, a lifting mechanism powered by the motor and operable to move the driver blade from the driven position toward the ready position, an electric motor operable to supply torque to the lifting mechanism to move the driver blade from the driven position toward the ready position, a pusher mechanism coupled to the nosepiece for individually transferring collated fasteners in the canister magazine to a driver channel in the nosepiece in which the driver blade is movable, and a gear train operable to receive torque from the electric motor and distribute torque to the lifting mechanism, causing the pusher mechanism to be driven in sync with the lifting mechanism. The pusher mechanism includes a body coupled to the nosepiece for relative translation therewith, a feeder arm pivotably coupled to the body for movement therewith and engageable with a forwardmost fastener of the collated fasteners to transfer the forwardmost fastener into the driver channel, and a lever pivotably coupled to the nosepiece about a pivot axis. The lever has a first end engageable with the body for imparting reciprocating translation to the body relative to the nosepiece in response to pivoting movement of the lever in opposite directions about the pivot axis, and an opposite, second end.

The present invention provides, in another aspect, a powered fastener driver including a housing, a motor positioned within the housing, a storage chamber cylinder of pressurized gas positioned within the housing, a moveable piston positioned within the storage chamber cylinder, a nosepiece coupled to the housing and extending therefrom, a driver blade attached to the piston and movable within the nosepiece between a ready position and a driven position, a canister magazine coupled to the nosepiece in which collated fasteners are receivable, a lifting mechanism operable to move the driver blade from the driven position toward the ready position, an electric motor operable to supply torque to the lifting mechanism to move the driver blade from the driven position toward the ready position, and a pusher mechanism coupled to the nosepiece for individually transferring collated fasteners in the canister magazine to a driver channel in the nosepiece in which the driver blade is movable. The pusher mechanism includes a body coupled to the nosepiece for relative translation therewith, a feeder arm pivotably coupled to the body for movement therewith and engageable with a forwardmost fastener of the collated fasteners to transfer the forwardmost fastener into the driver channel, and a solenoid having a solenoid housing and a plunger extending therefrom. The plunger is coupled to the body for imparting reciprocating translation to the body in response to activation and deactivation of the solenoid. The lifting mechanism drives the piston and the driver blade to the ready position by energizing the motor.

Additional features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
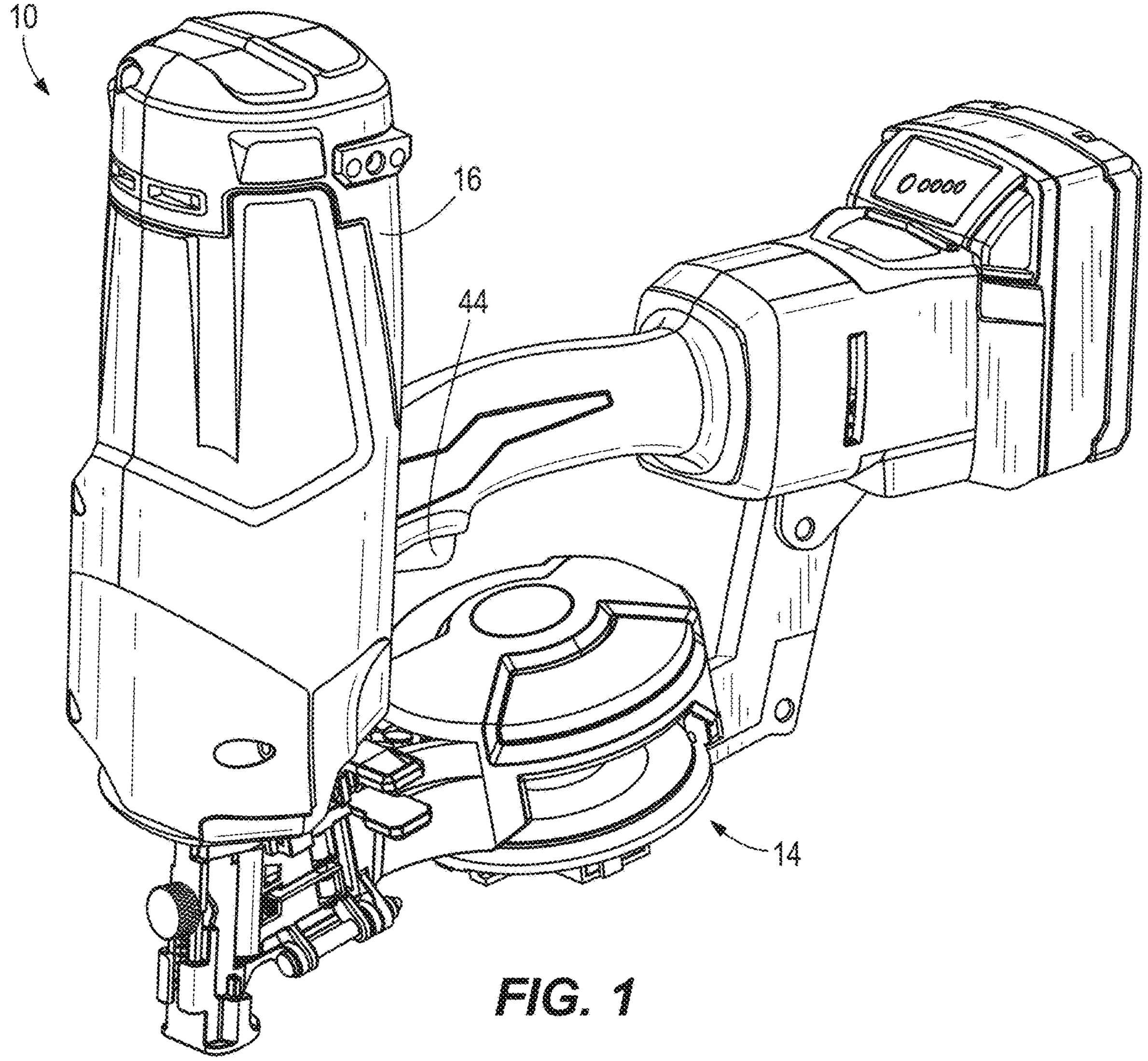
FIG. 1 is a perspective view of a powered fastener driver in accordance with an embodiment of the invention.
Figure 2:
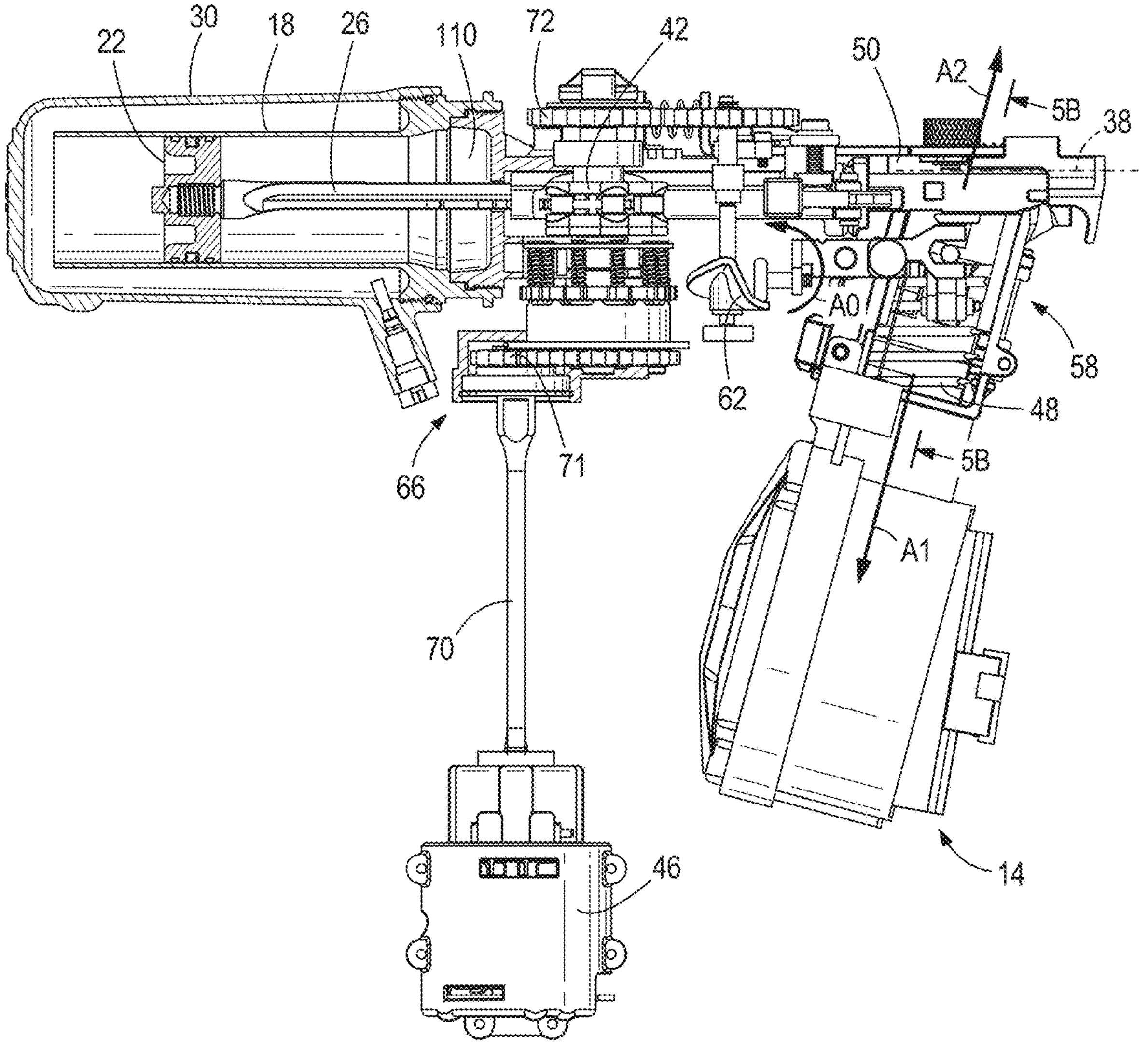
FIG. 2 is a plan view of the fastener driver of FIG. 1, with the housing removed, illustrating a pusher mechanism.

With reference to FIGS. 1 and 2, a gas spring-powered fastener driver 10 is operable to drive fasteners (e.g., nails) held within a canister magazine 14 into a workpiece. The fastener driver 10 includes a housing 16, a cylinder 18 positioned within the housing 16, and a moveable piston 22 positioned within the cylinder 18. The fastener driver 10 further includes a driver blade 26 that is attached to the piston 22 and moveable therewith. The fastener driver 10 does not require an external source of air pressure, but rather includes a storage chamber cylinder 30 of pressurized gas in fluid communication with the cylinder 18. In the illustrated embodiment, the cylinder 18 and moveable piston 22 are positioned within the storage chamber cylinder 30.

With reference to FIG. 2, the cylinder 18 and the driver blade 26 define a driving axis 38, and during a driving cycle the driver blade 26 and piston 22 are moveable between a ready position (i.e., top dead center) and a driven position (i.e., bottom dead center). The fastener driver 10 further includes a lifting mechanism 42, which is powered by a motor 46, and which is operable to move the driver blade 26 from the driven position to the ready position.

In operation, the lifting mechanism 42 drives the piston 22 and the driver blade 26 to the ready position by energizing the motor 46. As the piston 22 and the driver blade 26 are driven to the ready position, the gas above the piston 22 and the gas within the storage chamber cylinder 30 is compressed. Once in the ready position, the piston 22 and the driver blade 26 are held in position until released by user activation of a trigger 44. When released, the compressed gas above the piston 22 and within the storage chamber 30 drives the piston 22 and the driver blade 26 to the driven position, thereby driving a fastener into a workpiece. The illustrated fastener driver 10 therefore operates on a gas spring principle utilizing the lifting assembly 42 and the piston 22 to further compress the gas within the cylinder 18 and the storage chamber cylinder 30.

Figure 3:
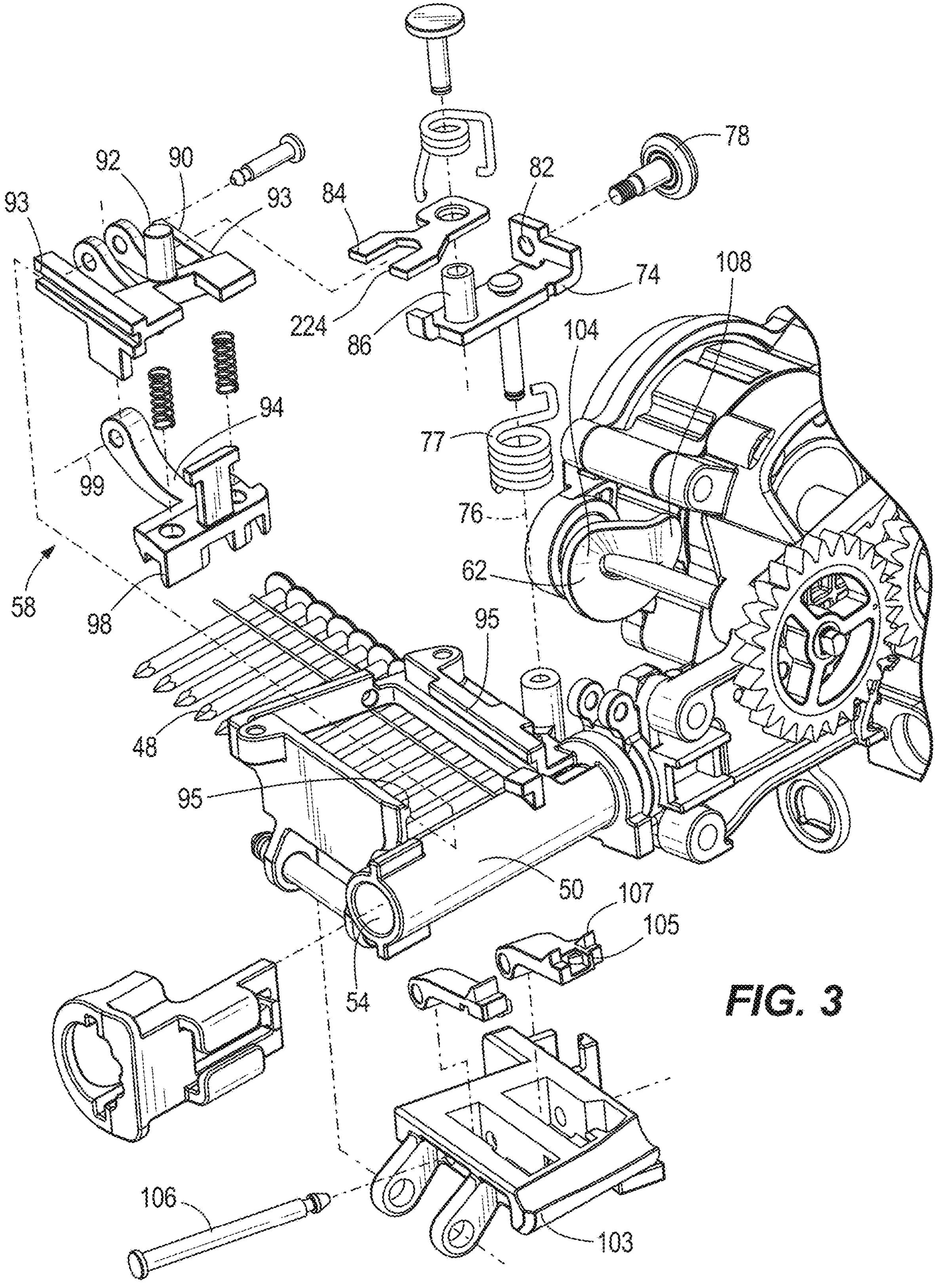
FIG. 3 is an exploded front perspective view of the pusher mechanism of FIG. 2.
Figure 4:
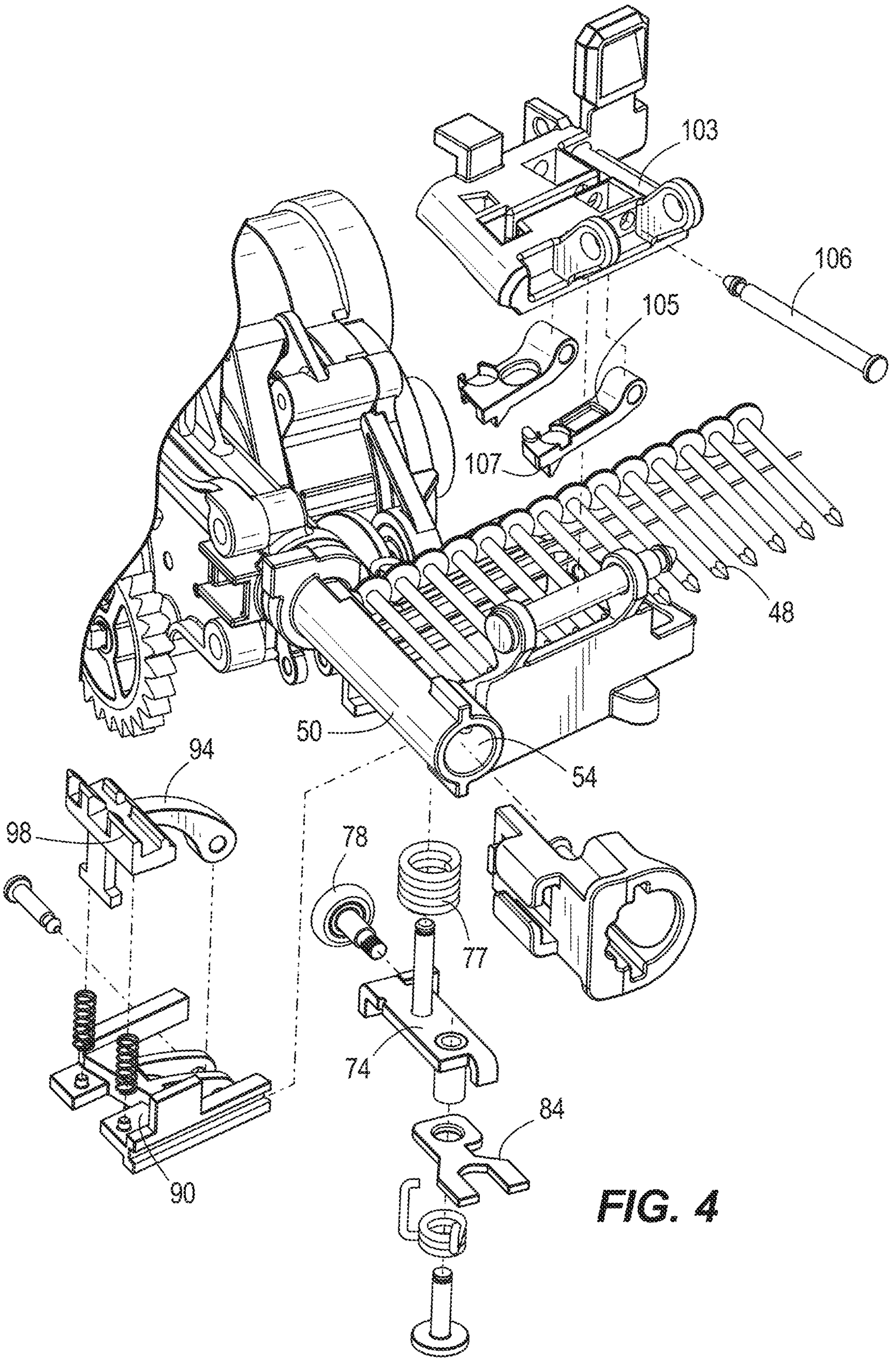
FIG. 4 is another exploded front perspective view of the pusher mechanism of FIG. 2.

The canister magazine 14 includes collated fasteners 48 arranged in a coil. The magazine 14 is coupled to a nosepiece 50 in which the fasteners 48 are received (FIGS. 3-4). The fasteners 48 are sequentially transferred or loaded from the magazine 14 to a driver channel 54 in the nosepiece 50 by a pusher mechanism 58. After the fastener 48 is inserted into the driver channel 54, the driver blade 26 is movable within the driver channel 54 to discharge the fastener 48 into a workpiece.

With reference to FIGS. 2 and 3, the pusher mechanism 58 is driven in sync with the lifting mechanism 42 by a gear train 66 coupled to a transmission output shaft 70 and a cam 62 that receives torque from the gear train 66, causing the cam 62 to rotate in unison with the lifting mechanism 42. The gear train 66 consists of a first gear set 71 on the nosepiece 50 are received. The motion of the sliding body 90 is constrained to reciprocating linear movement in the direction of arrows A1, A2 (shown in FIG. 2) that are parallel with the guide rails 95 relative to the magazine 14.

The pusher mechanism 58 further includes a feeder arm 94 that is pivotably coupled to the sliding body 90 about a pivot axis 99 that is perpendicular to the direction of movement of the sliding body 90 along arrows A1, A2. Because the feeder arm 94 is supported upon the sliding body 90, the feeder arm 94 reciprocates with the sliding body 90 in the direction of arrows A1, A2 in response to reciprocating pivoting movement of a lever 74.

Figure 5A:
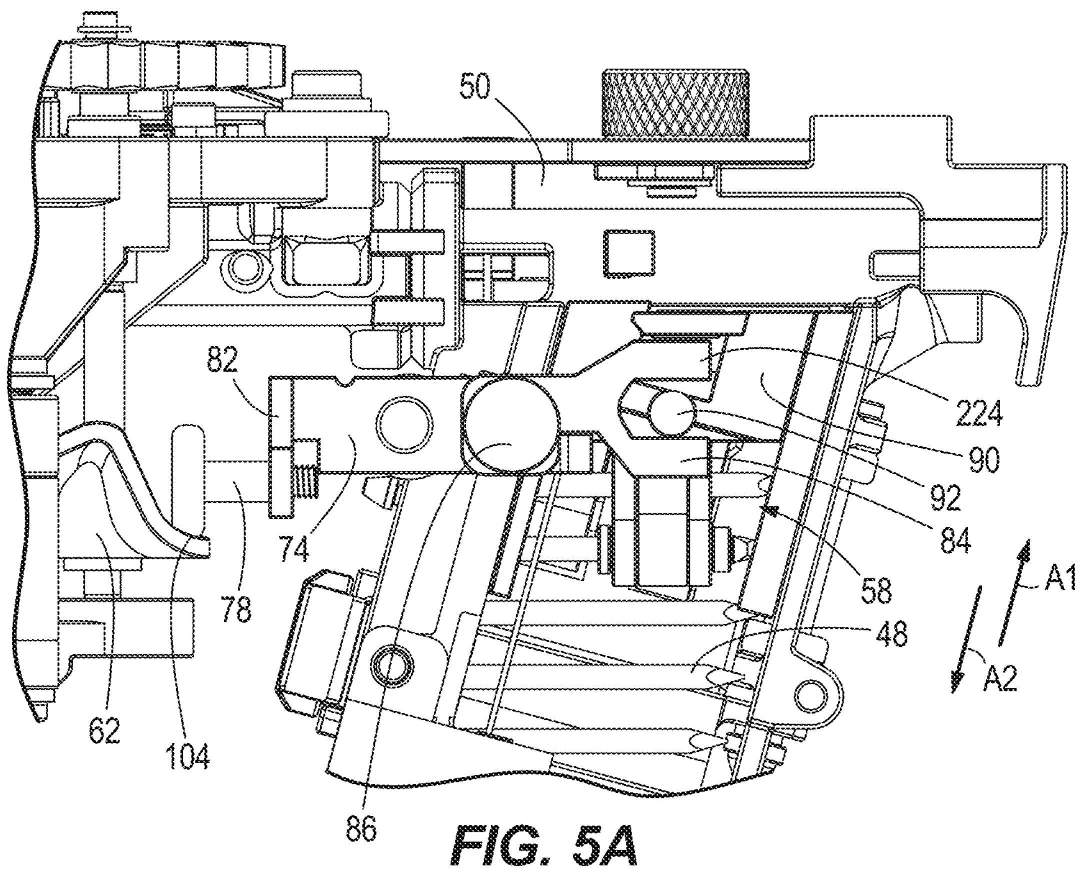
FIG. 5A is a plan view of the pusher mechanism of FIG. 2 at the beginning of a firing cycle.
Figure 5B:
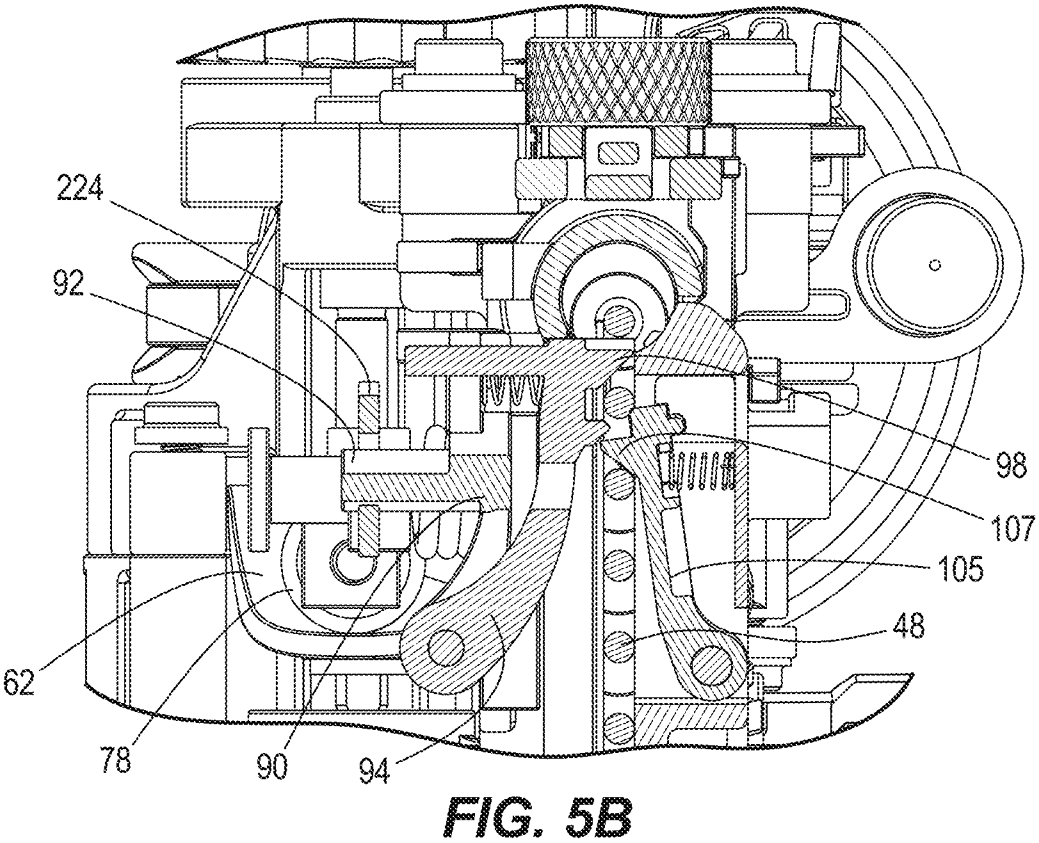
FIG. 5B is a cross-sectional view of the pusher mechanism of FIG. 5A at the beginning of a firing cycle.

Prior to initiation of a firing cycle, a forward-most fastener 48 is positioned in the driver channel 54, the sliding body 90 is located in a forward-most position relative to the nosepiece 50, and the feeder arm 94 is pivoted to an inboard position to thereby receive one of the fasteners 48 behind the forward-most fastener 48 in aligned notches 98 in the feeder arm 94 (FIGS. 4 and 5B). The forward-most position of the sliding body 90 coincides with the roller 78 being in contact with a valley 104 on the cam 62 (shown in FIG. 2).

Figure 6A:
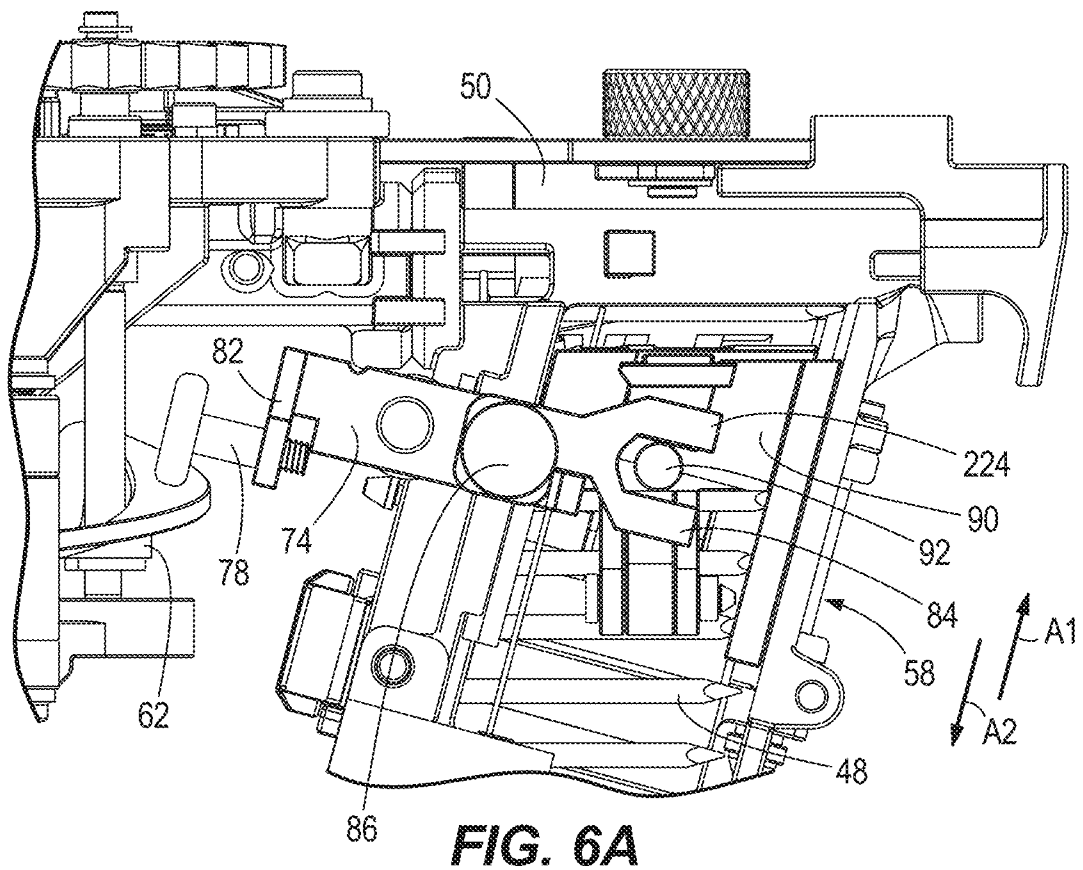
FIG. 6A is a plan view of the pusher mechanism of FIG. 2 during the firing cycle.
Figure 6B:
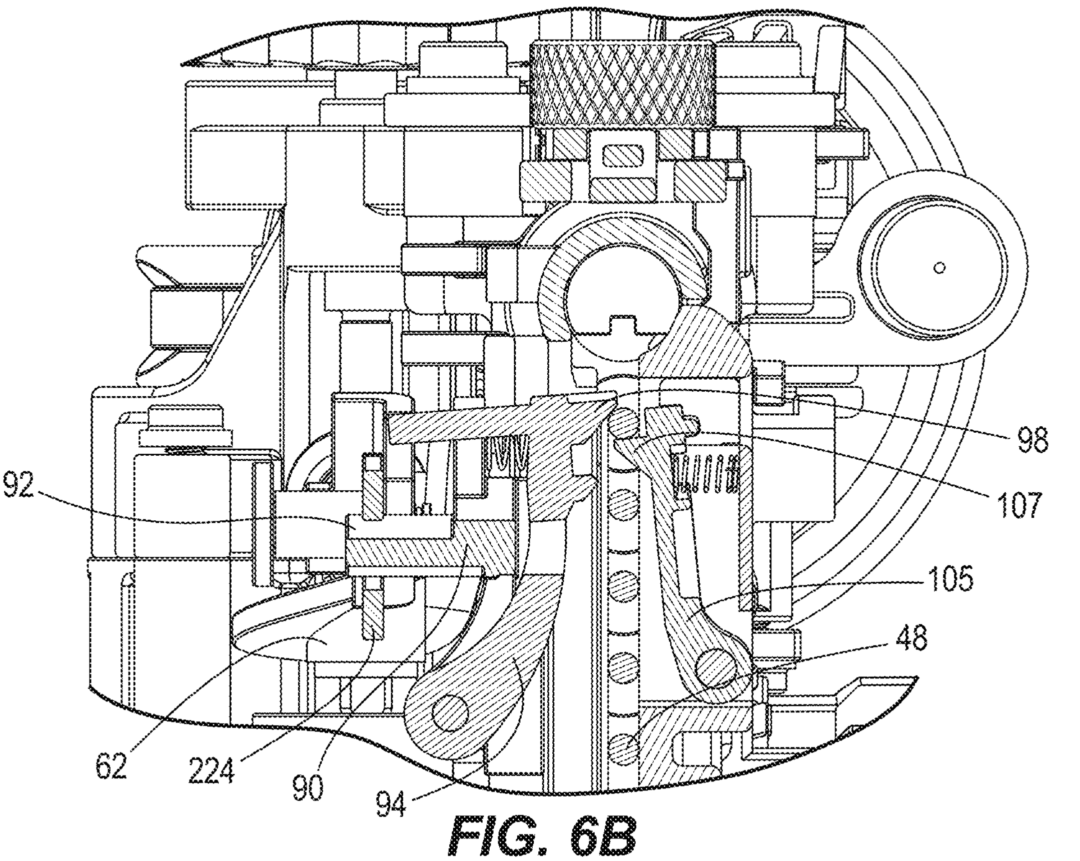
FIG. 6B is a cross-sectional view of the pusher mechanism of FIG. 6A during the firing cycle.
Figure 7A:
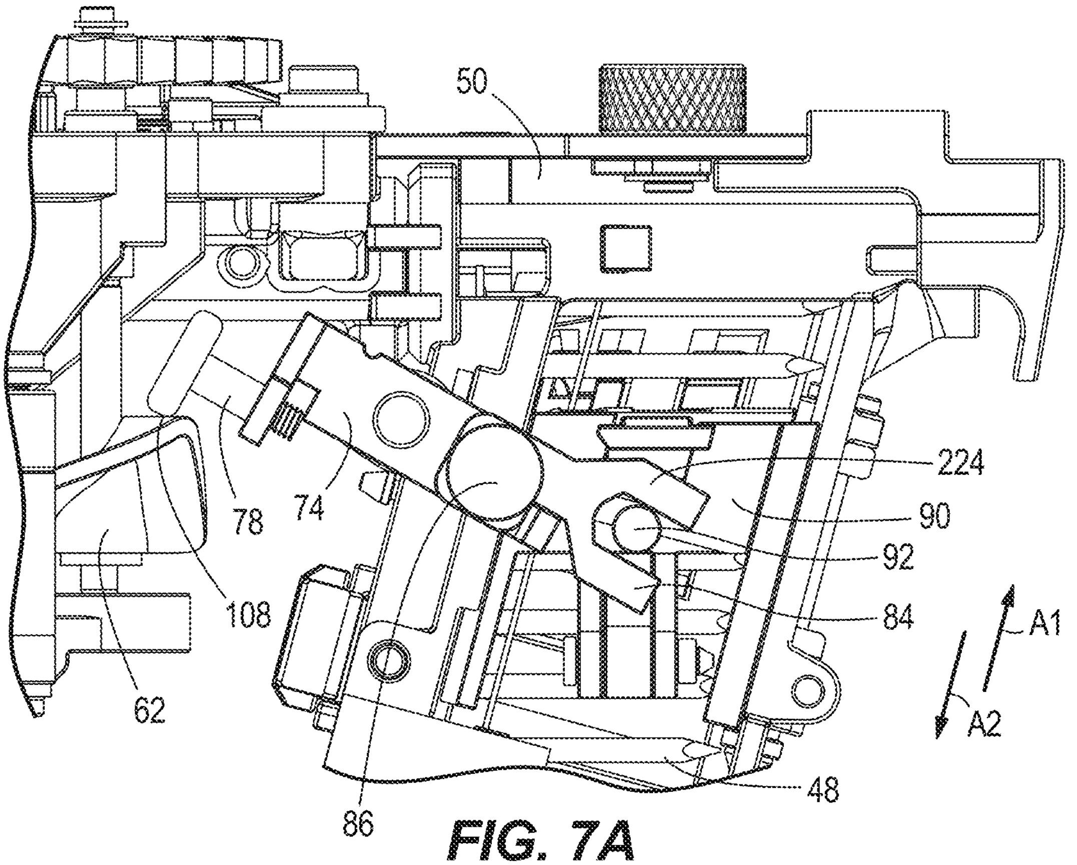
FIG. 7A is a plan view of the pusher mechanism of FIG. 2 during the firing cycle.
Figure 7B:
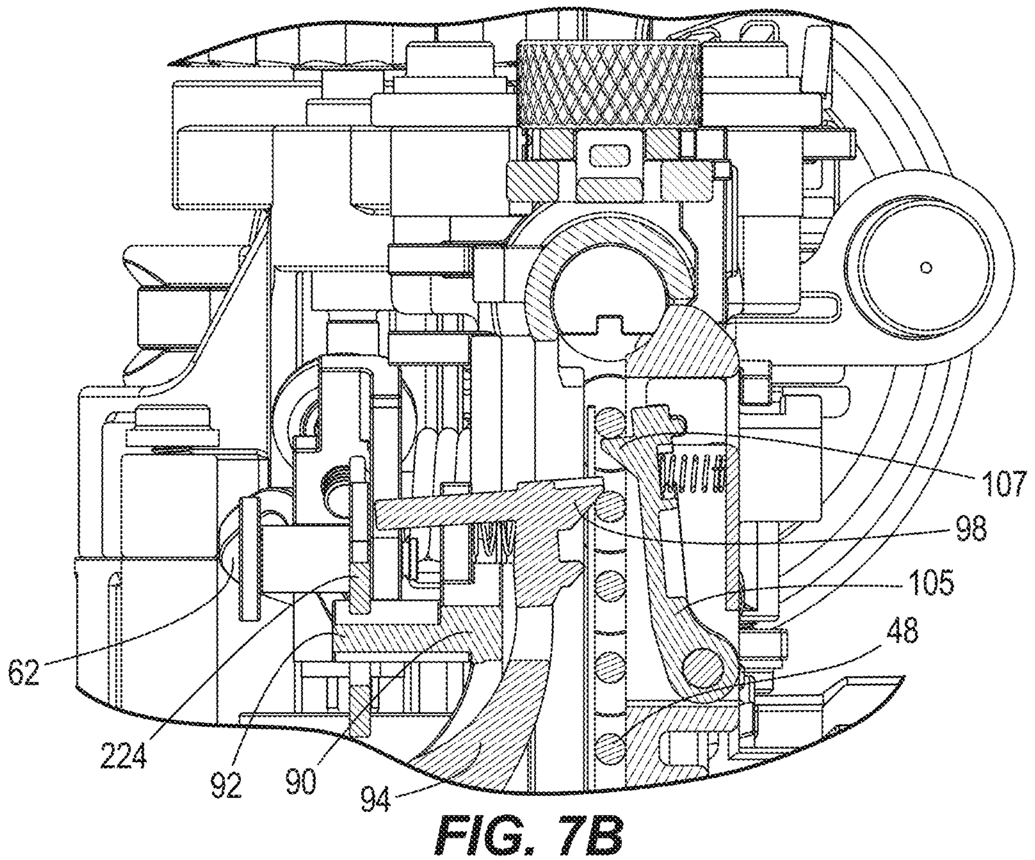
FIG. 7B is a cross-sectional view of the pusher mechanism of FIG. 7A during the firing cycle.
Figure 8A:
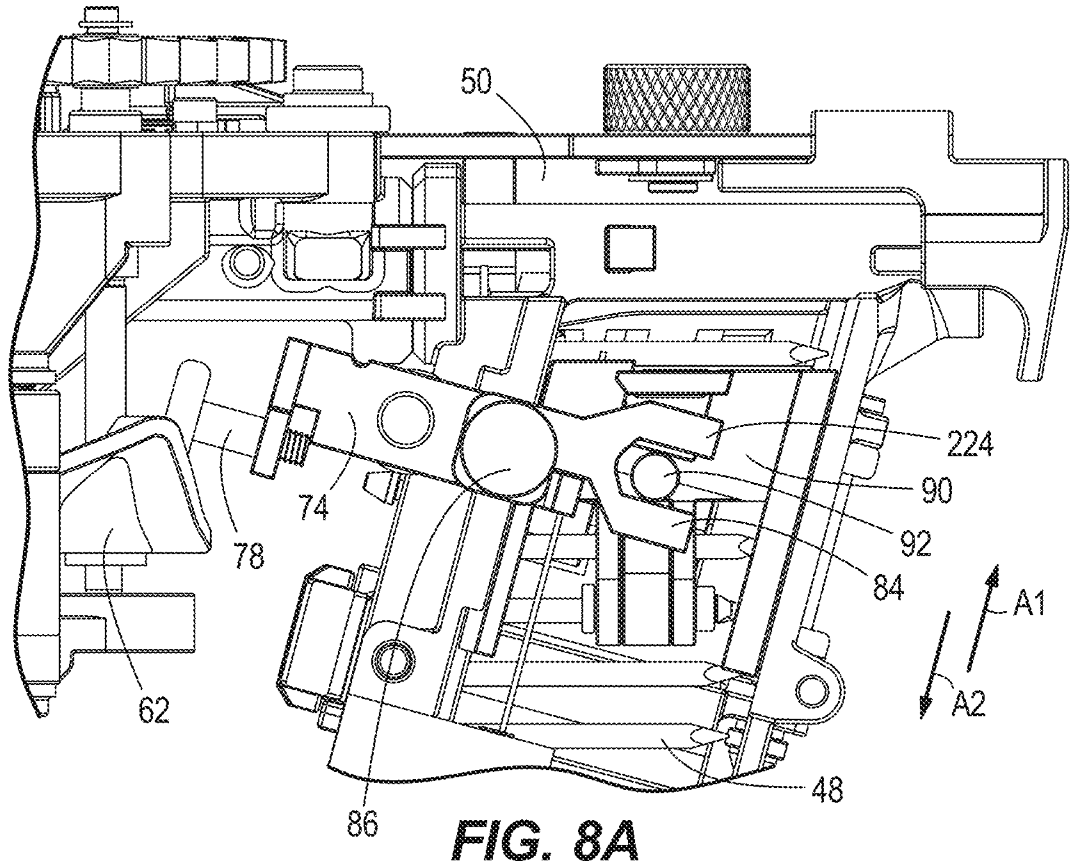
FIG. 8A is a plan view of the pusher mechanism of FIG. 2 at the end of the firing cycle.
Figure 8B:
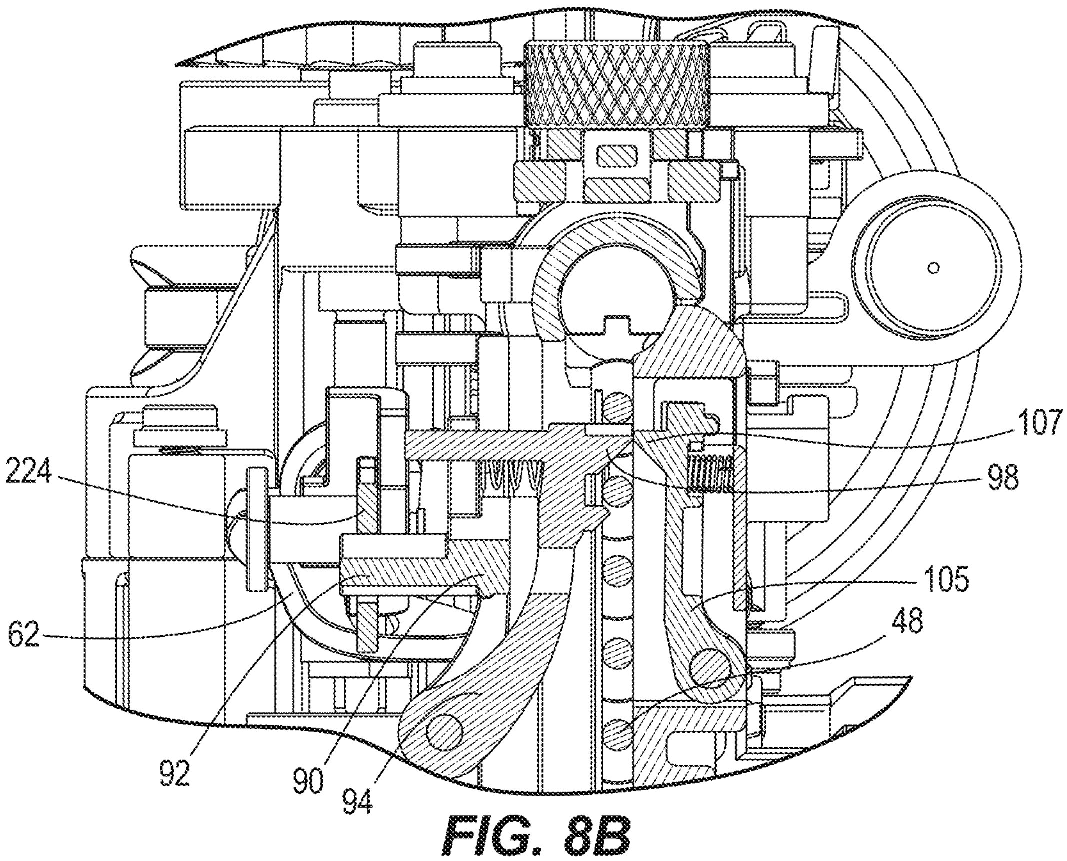
FIG. 8B is a cross-sectional view of the pusher mechanism of FIG. 8A at the end of the firing cycle.

With reference to FIGS. 3 and 4, check pawls 105 are pivotably coupled to a shaft 106 carried on a nosepiece access door 103, which is pivotably coupled to the nosepiece 50. Each check pawl 105 includes a finger 107 that is in contact with the fasteners 48. Springs (FIG. 5B) bias the respective check pawls 105 toward the fasteners 48 to maintain the fingers 107 in contact with the fasteners 48 as the fasteners 48 are advanced toward the nosepiece 50. In operation, as the feeder arm 94 is retracted in the direction A1 (FIG. 6B), the fingers 107 of the respective check pawls 105 remain engaged with one of the collated fasteners 48 while the feeder arm 94 pivots around the same fastener 48. After clearing the fastener 48, the feeder arm 94 pivots toward an inboard position and behind the fastener 48 (FIG. 7B). As the feeder arm 94 moves the fastener 48 to the driver channel 54, the check pawls 105 are biased away from the fasteners 48 to allow the collated fasteners 48 to advance (FIG. 8B). The springs biasing the respective check pawls 105 then rebound, positioning the check pawls 105 between the next two fasteners 48 in the sequence, preventing backwards movement of the collated fasteners 48 toward the canister magazine 14 (FIG. 6B).

When a firing cycle is initiated (e.g., by a user pulling a trigger 44 of the fastener driver 10), the motor 46 is activated to rotate the lifting mechanism 42, which releases the driver blade 26, permitting the gas in the storage chamber cylinder 30 to expand and push the piston 22 downward into the cylinder 18. Prior to the piston 22 reaching the bottom dead center position in the cylinder 18, the driver blade 26 impacts the fastener 48 in the driver channel 54, discharging the fastener 48 from the nosepiece 50 and into the workpiece. During this time, the lifting mechanism 42 continues to rotate (i.e, by the motor 46 providing torque to the transmission output shaft 70), returning the piston 22 and driver blade 26 to the ready position in the cylinder 18. Simultaneously, the rotating transmission output shaft 70 and gear train 66 rotates the cam 62.

The cam 62 rotates nearly 360 degrees, causing the roller 78 to follow the cam 62 as the cam surface transitions from the valley 104 to a peak 108 (FIGS. 5A, 6A, and 7A), imparting pivoting movement to the lever 74 about the axis 76 in a direction opposite the arrow A0 (FIG. 2). As the lever 74 pivots, the fork 84 pushes the protruding pin 92 of the sliding body 90, converting the pivoting motion of the lever 74 to linear motion of the body 90 (FIG. 6A). As the body 90 slides away from the driver channel 54 in the direction of A1, the feeder arm 94 pivots to clear the next fastener in the sequence (FIGS. 6A and 6B). At this time, the check pawls 105 remain engaged with one of the fasteners 48, preventing the collated fasteners 48 from being driven rearward toward the canister magazine 14. When the body 90 is at a position farthest from the driver channel 54 (i.e., when the body 90 changes the direction of translation from A1 to A2), the springs biases the feeder arm 94 behind the next fastener 48 in the sequence (FIGS. 7A and 7B). Then, continued rotation of the cam 62 causes the roller 78 to transition from the peak 108 back to the valley 104, allowing the torsion spring 77 acting on the lever 74 to rebound, pivoting the lever 74 in the direction of arrow A0 and moving the fork 84 and, thus, the body 90 forward. Forward motion of the body 90 toward the driver channel 54 in the direction of A2 moves the feeder arm 94 forward (FIGS. 8A and 8B) and thus, pushes the collated fasteners 48 forward, and one of which into the driver channel 54A (FIGS. 5A and 5B). As such, pivoting movement of the lever 74 in the direction of arrow A0 and then a direction opposite arrow A0 as described above defines a complete reloading cycle of one of the collated fasteners 48 into the driver channel 54.

In an alternative embodiment of the fastener driver (not shown), the pusher mechanism 58 may be actuated by the impact of the driver blade 26 upon reaching the driven position. As the driver blade 26 moves from the ready position to the driven position, the driver blade 26 may either directly contact or indirectly contact (e.g., via an arm or linkage, not shown) the roller 78, which imparts pivotal motion to the lever 74. As described above, the pivotal motion imparted on the lever 74 displaces the sliding body 90 and feeder arm 94 along arrow A2, allowing the feeder arm 94 to pick up the next fastener 48 in the collated strip. Thereafter, the torsion spring acting on the lever 74 rebounds, pivoting the lever 74 in the direction of arrow A0 and displacing the sliding body 90 and feeder arm 94 in the direction of arrow A1 (FIG. 2), positioning another fastener 48 in the driver channel 54 as described above.

In another alternative embodiment of the fastener driver (not shown), the pusher mechanism 58 may be actuated by the impact of the piston 22 on a bumper 110 (FIG. 2) within the cylinder 18 for stopping the driver blade 26 in the driven position. The bumper 110 may either directly contact or indirectly contact (e.g., via an arm or linkage, not shown) the roller 78, which imparts pivotal motion to the lever 74. As described above, the pivotal motion imparted on the lever 74 displaces the sliding body 90 and feeder arm 94 along arrow A2, allowing the feeder arm 94 to pick up the next fastener 48 in the collated strip. Thereafter, the torsion spring acting on the lever 74 rebounds, pivoting the lever 74 in the direction of arrow A0 and displacing the sliding body 90 and feeder arm 94 in the direction of arrow A1 (FIG. 2), positioning another fastener 48 in the driver channel 54 as described above.

Figure 9:
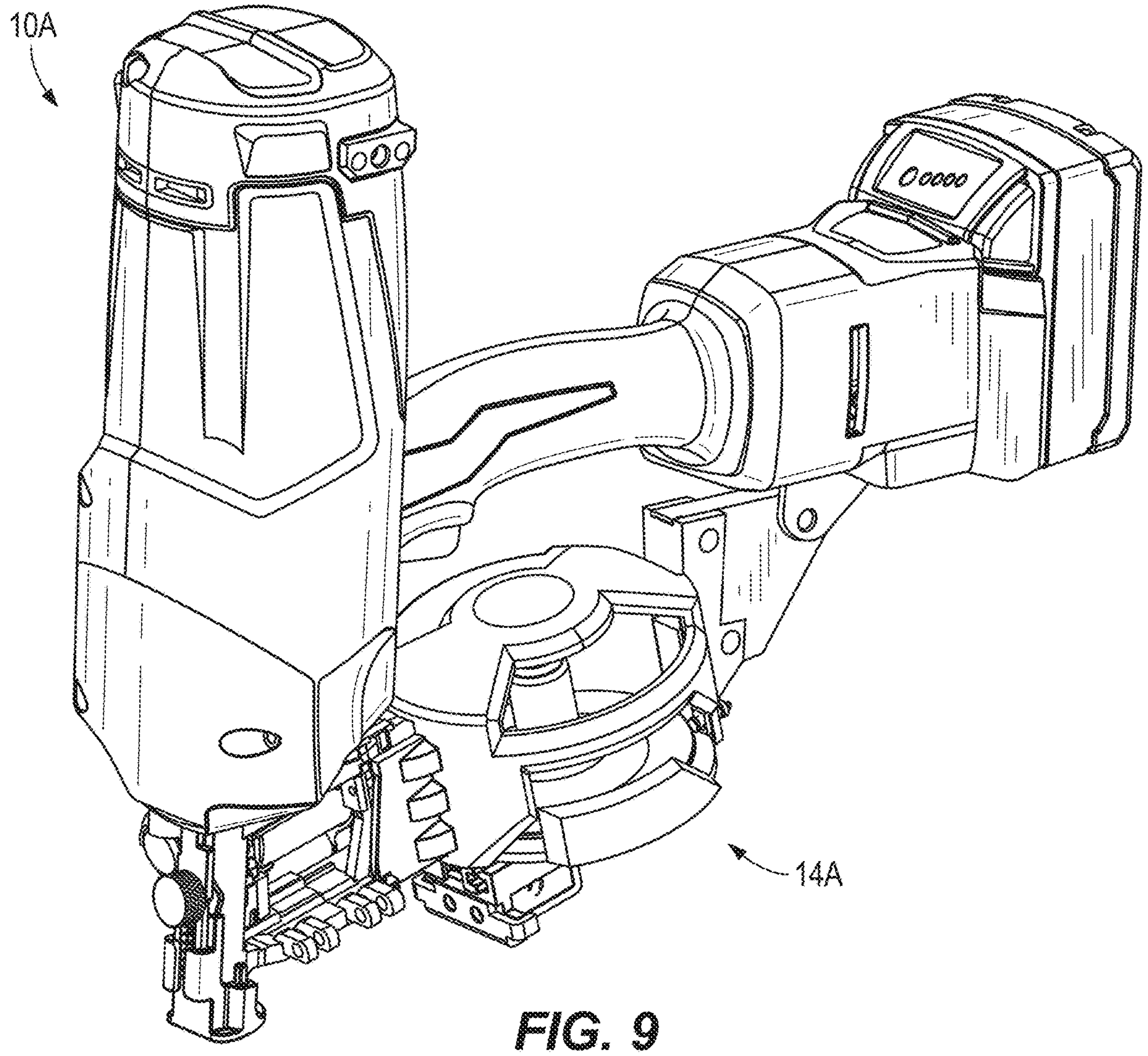
FIG. 9 is a perspective view of a powered fastener driver according to another embodiment of the invention.
Figure 10:
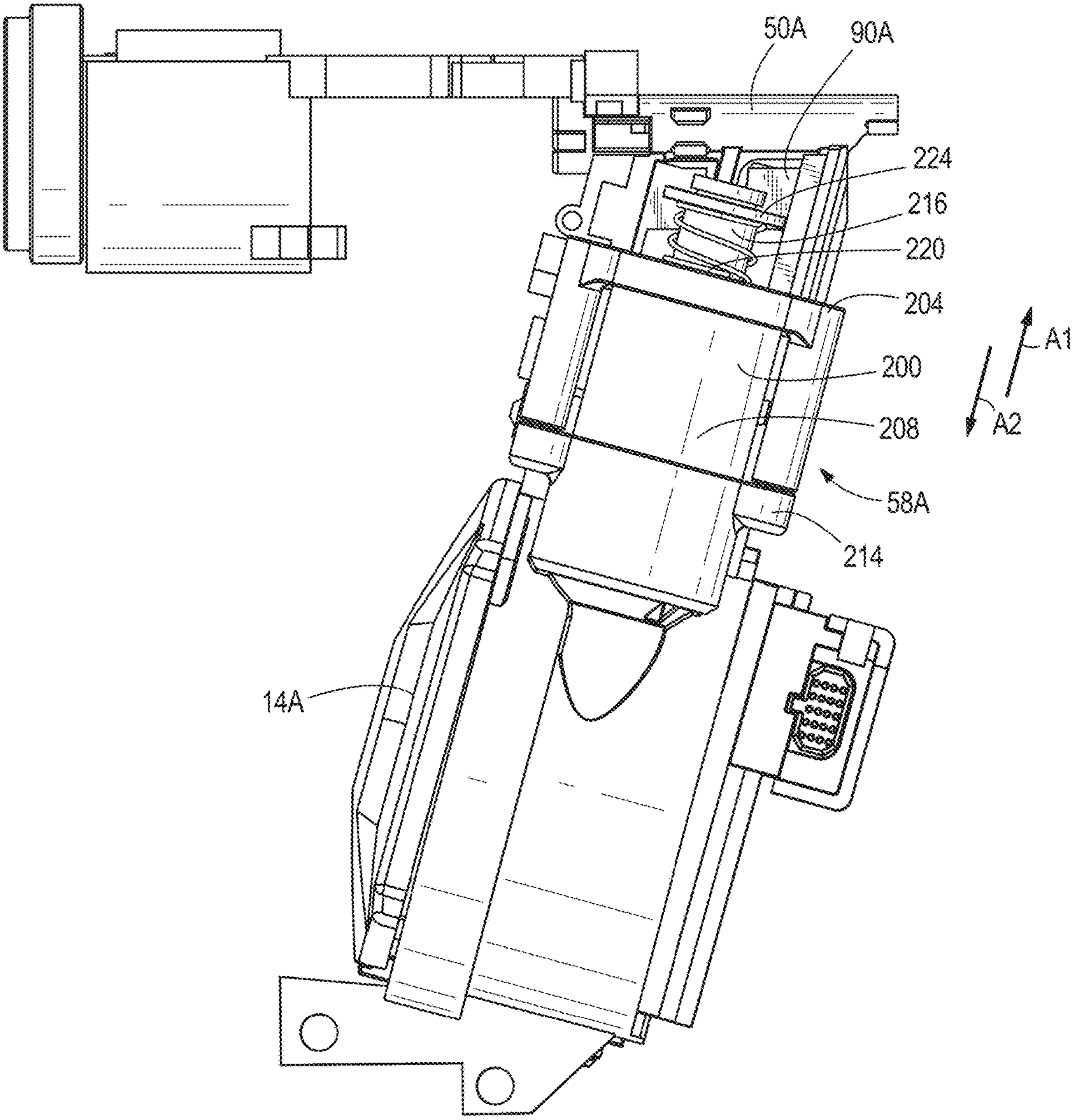
FIG. 10 is a plan view of the powered fastener driver of FIG. 9, with the housing removed, illustrating a pusher mechanism.

FIG. 9 illustrates a gas spring-powered fastener driver 10A including another embodiment of a pusher mechanism 58A. The driver 10A is similar to the driver 10 described above with reference to FIGS. 1-8. Accordingly, features and elements of the driver 10A corresponding with features and elements of the driver 10 are given like reference numbers followed by the letter 'A.' In addition, the following description focuses primarily on differences between the pusher mechanism 58A and the pusher mechanism 58.

Figure 11:
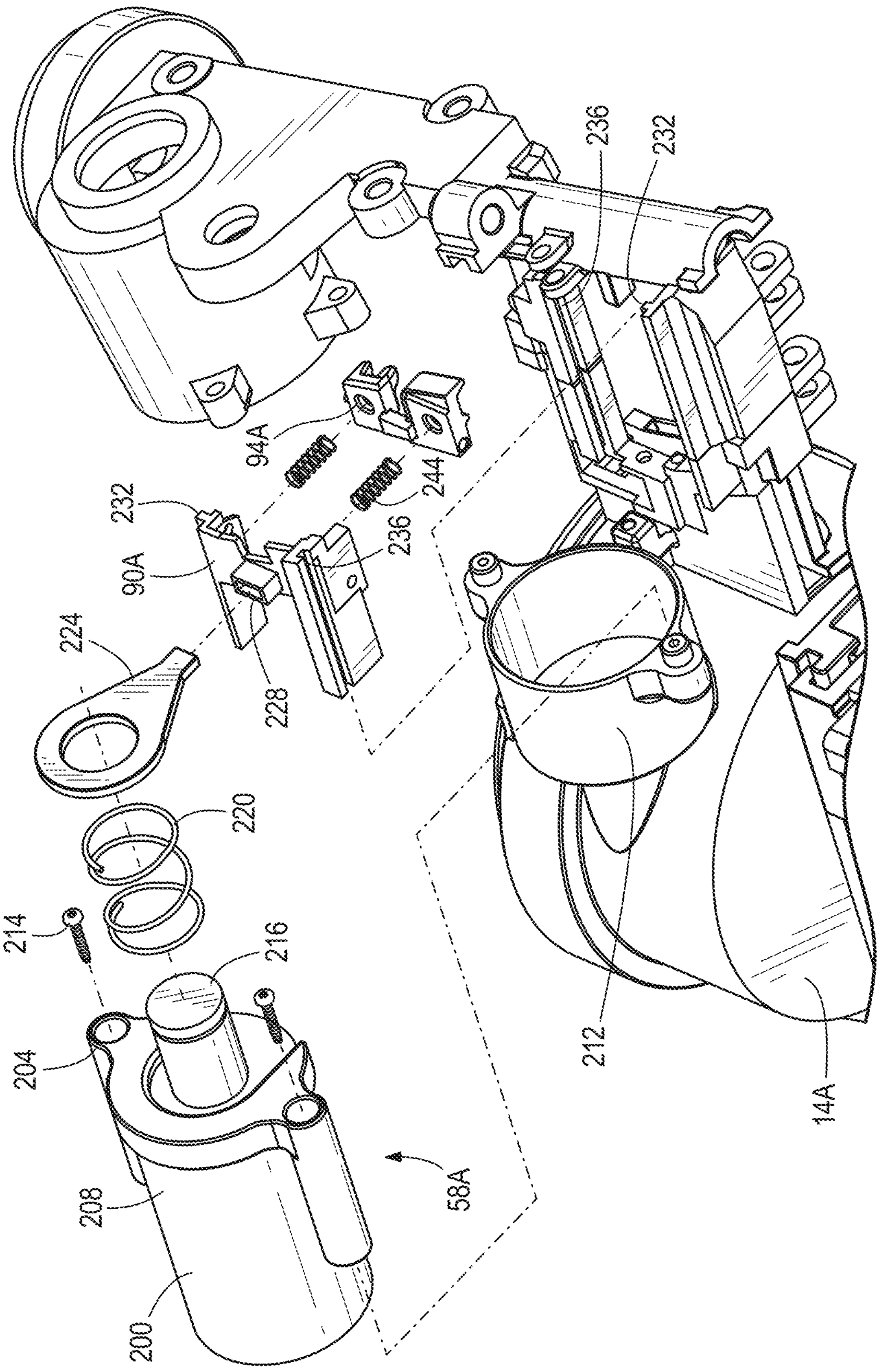
FIG. 11 is an exploded front perspective view of the pusher mechanism of FIG. 10.

Similar to the driver 10, the driver 10A includes a lifting mechanism 42A that returns a piston 22A and a driver blade 26A to the ready position by energizing a motor 46A. The pusher mechanism 58A differs from the pusher mechanism 58 in that the pusher mechanism 58A is not driven in sync with the lifting mechanism 42A by a gear train. Rather, the pusher mechanism 58A includes a solenoid 200 (FIG. 11) coupled to the canister magazine 14A via a bracket 204 clamping a solenoid housing 208 to a mount portion 212 of the canister magazine 14A. The bracket 204 is fastened to the mount portion 212 of the canister 14A via a plurality of fasteners 214 or the like. A plunger 216 is disposed within the solenoid housing 208 and is movable between an extended position and a retracted position. In the extended position, a plunger spring 220 disposed around the plunger 216 biases the plunger 216 from the solenoid housing 208. In the retracted position, the solenoid 200 is engaged, meaning an electromagnet attracts the plunger 216 within the solenoid housing 208, against the bias of the spring 220. A plate 224 is coupled to an end of the plunger 216 such that movement of the plunger 216 imparts reciprocating movement to the plate 224. The pusher mechanism 58A further includes a sliding body 90A, which has an opening 228 for receiving an end of the plate 224 to secure the body 90A to the plate 224. The motion of the sliding body 90A is constrained to reciprocating linear movement in the direction of arrows A1, A2 relative to the magazine 14A by engaged guide rails 232 and grooves 236. A feeder arm 94A is pivotably coupled to the sliding body 90A about a pivot axis 99A that is perpendicular to the direction of movement of the sliding body 90A along arrows A1, A2 and is biased toward the fasteners 48 by compression springs 244. Because the feeder arm 94A is supported upon the sliding body 90A, the feeder arm 94A reciprocates with the sliding body 90A in the direction of arrows A1, A2 in response to reciprocating movement of the plunger 216.

In operation, after the driver blade 26A strikes the fastener 48, the solenoid 200 is activated, retracting the plunger 216 and, thus, sliding the body 90A away from the driver channel 54A in the direction of A1, allowing the feeder arm to pivot to clear the next fastener 48 in the sequence. When the plunger 216 is completely retracted, the body 90A is at a position farthest from the driver channel 54A, allowing the springs to bias the feeder arm behind the next fastener 48 in the sequence. At this time, the solenoid 200 is deactivated, causing the plunger spring 220 to bias the plunger 216 outward. The outward motion of the plunger 216 moves the body 90A and, in turn, the feeder arm toward the driver channel 54A. When the plunger 216 is completely extended, a forward most fastener 48 is delivered to the driver channel 54A by the feeder arm.

The system that determines when the solenoid 200 is energized is an open feedback system, meaning the system does not know the location of the lifting mechanism 42A.

Instead, once a user pulls the trigger 44, the system operates based on predetermined timing to activate and deactivate the solenoid 200.

Various features of the invention are set forth in the following claims.

What is claimed is:

1. A powered fastener driver comprising:

a housing;

a nosepiece coupled to the housing and extending therefrom;

a cylinder positioned within the housing;

a storage chamber cylinder at least partially surrounding the cylinder and containing therein pressurized gas in fluid communication with the cylinder;

a moveable piston positioned within the cylinder;

a driver blade attached to the piston and movable within the nosepiece between a ready position and a driven position;

a canister magazine coupled to the nosepiece in which collated fasteners are receivable;

a lifting mechanism operable to move the driver blade from the driven position toward the ready position;

an electric motor operable to supply torque to the lifting mechanism to move the driver blade from the driven position toward the ready position; and a pusher mechanism coupled to the nosepiece for individually transferring collated fasteners in the canister magazine to a driver channel in the nosepiece in which the driver blade is movable, the pusher mechanism including:

a body coupled to the nosepiece for relative translation therewith, and a feeder arm coupled to the body for movement therewith and engageable with a forwardmost fastener of the collated fasteners to transfer the forwardmost fastener into the driver channel, wherein the pusher mechanism includes a lever pivotably coupled to the nosepiece about a pivot axis, and wherein the lever is configured to impart translation to the body relative to the nosepiece.

2. The powered fastener driver of claim 1, wherein the lever has a first end engageable with the body for imparting reciprocating translation to the body relative to the nosepiece in response to pivoting movement of the lever about the pivot axis.

3. The powered fastener driver of claim 2, wherein reciprocating translation of the body is constrained to reciprocating linear movement.

4. The powered fastener driver of claim 3, wherein the feeder arm reciprocates with the body in response to reciprocating linear movement of the body.

5. The powered fastener driver of claim 2, further comprising:

a cam with which a second end of the lever is engaged for imparting reciprocating pivoting movement to the lever; and a gear train for providing torque to the lifting mechanism, causing the lifting mechanism to rotate, wherein the cam also receives torque from the gear train, causing the cam to rotate in unison with the lifting mechanism.

6. A powered fastener driver comprising:

a housing;

a nosepiece coupled to the housing and extending therefrom;

a driver blade movable within the nosepiece between a ready position and a driven position;

a canister magazine coupled to the nosepiece in which collated fasteners are receivable;

a lifting mechanism operable to move the driver blade from the driven position toward the ready position;

an electric motor operable to supply torque to the lifting mechanism to move the driver blade from the driven position toward the ready position;

a pusher mechanism coupled to the nosepiece for individually transferring collated fasteners in the canister magazine to a driver channel in the nosepiece in which the driver blade is movable, the pusher mechanism including:

a body coupled to the nosepiece for relative translation therewith, a feeder arm pivotably coupled to the body for movement therewith and engageable with a forwardmost fastener of the collated fasteners to transfer the forwardmost fastener into the driver channel, and a lever pivotably coupled to the nosepiece about a pivot axis, the lever having a first end engageable with the body for imparting reciprocating translation to the body relative to the nosepiece in response to pivoting movement of the lever in opposite directions about the pivot axis, and an opposite, second end; and a gear train operable to receive torque from the electric motor and distribute torque to the lifting mechanism, causing the pusher mechanism to be driven in sync with the lifting mechanism.

7. The powered fastener driver of claim 6, further comprising a nosepiece access door pivotably coupled to the nosepiece.

8. The powered fastener driver of claim 7, wherein the nosepiece access door carries a shaft.

9. The powered fastener driver of claim 8, further comprising check pawls pivotably coupled to the shaft.

10. The powered fastener driver of claim 9, wherein each check pawl includes a finger that is in contact with the collated fasteners.

11. The powered fastener driver of claim 9, further comprising a plurality of springs configured to bias the check pawls toward the collated fasteners.

12. The powered fastener driver of claim 6, wherein reciprocating translation of the body is constrained to reciprocating linear movement.

13. The powered fastener driver of claim 12, wherein the feeder arm reciprocates with the body in response to reciprocating pivoting movement of the lever.

14. A powered fastener driver comprising:

a housing;

a storage chamber cylinder of pressurized gas positioned within the housing;

a moveable piston positioned within the storage chamber cylinder;

a nosepiece coupled to the housing and extending therefrom;

a driver blade attached to the piston and movable within the nosepiece between a ready position and a driven position;

a canister magazine coupled to the nosepiece in which collated fasteners are receivable;

a lifting mechanism operable to move the driver blade from the driven position toward the ready position;

an electric motor operable to supply torque to the lifting mechanism to move the driver blade from the driven position toward the ready position; and a pusher mechanism coupled to the nosepiece for individually transferring collated fasteners in the canister magazine to a driver channel in the nosepiece in which the driver blade is movable, the pusher mechanism including:

a feeder arm coupled to the nosepiece for relative translation therewith along a first axis, and engageable with a forwardmost fastener of the collated fasteners to transfer the forwardmost fastener into the driver channel, and a solenoid having a solenoid housing and a plunger extending therefrom, the plunger being coupled to the feeder arm and movable along a second axis parallel to the first axis for imparting reciprocating translation to the feeder arm in response to activation and deactivation of the solenoid;

wherein the lifting mechanism drives the piston and the driver blade to the ready position by energizing the electric motor.

15. The powered fastener driver of claim 14, wherein the canister magazine includes a mount portion to which the solenoid housing is coupled.

16. Powered fastener driver of claim 15, further comprising a bracket clamping the solenoid housing to the mount portion of the canister magazine.

17. The powered fastener driver of claim 16, wherein the bracket is fastened to the mount portion of the canister magazine.

18. The powered fastener driver of claim 14, wherein the solenoid includes a spring biasing the plunger from the solenoid housing.

19. The powered fastener driver of claim 18, wherein the solenoid includes an electromagnet configured to retract the plunger into the solenoid housing, against a bias of the spring, in response to being energized.

20. The powered fastener driver of claim 15, wherein the pusher mechanism further includes a body coupled between the plunger and the feeder arm, wherein the feeder arm is coupled to the body for movement therewith.

* * * * *